UNITED STATES PATENT OFFICE.

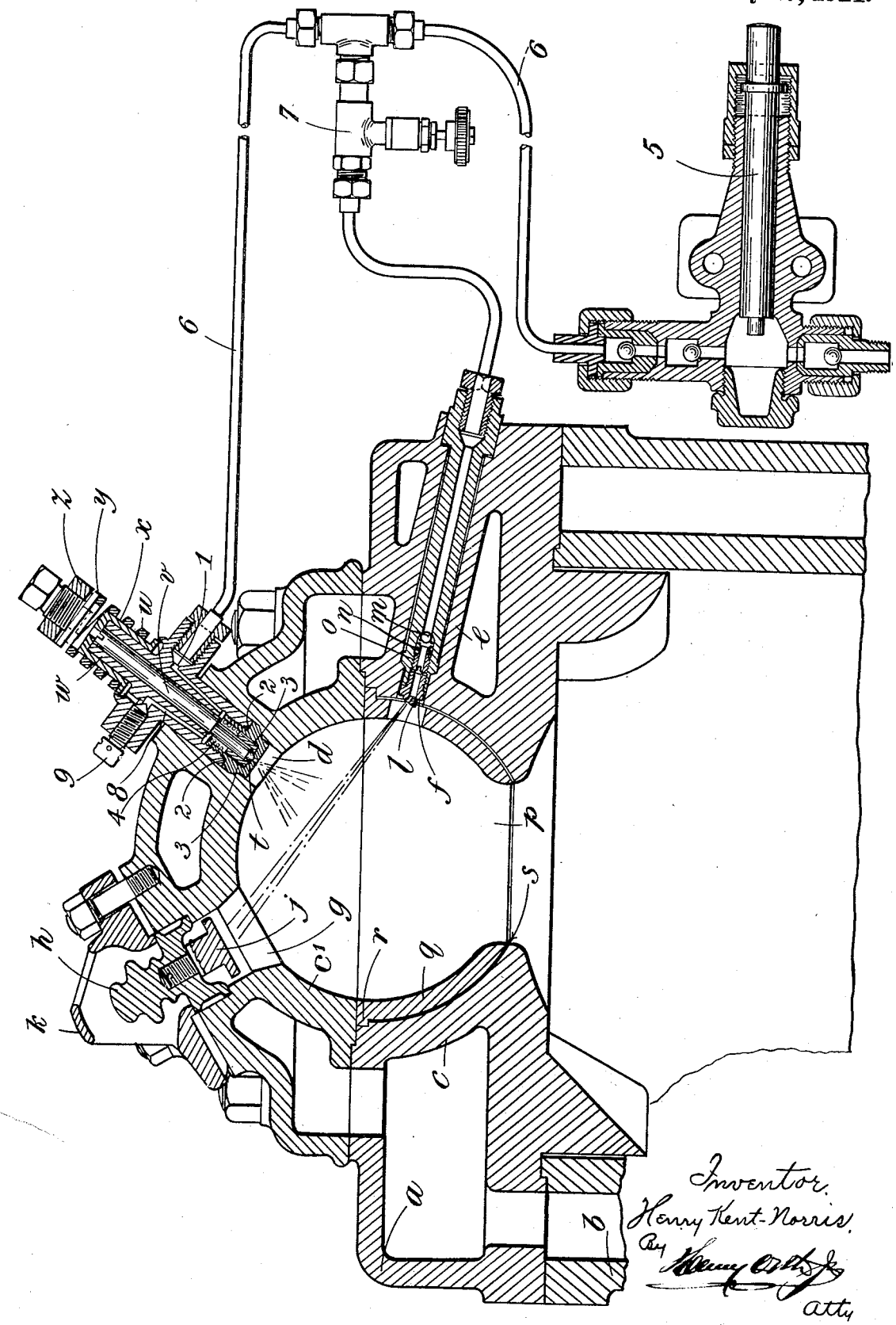

HENRY KENT-NORRIS, OF NEWBURY, ENGLAND.

MEANS FOR SUPPLYING LIQUID FUEL TO THE CYLINDERS OF INTERNAL-COMBUSTION ENGINES.

1,378,176.  Specification of Letters Patent.  Patented May 17, 1921.

Application filed October 11, 1920. Serial No. 416,219.

*To all whom it may concern:*

Be it known that I, HENRY KENT-NORRIS, a subject of the King of Great Britain, residing at Ashdown, Pyle Hill, Newbury, Berkshire, England, have invented certain new and useful Improvements in Means for Supplying Liquid Fuel to the Cylinders of Internal-Combustion Engines, of which the following is a specification.

This invention comprises improvements in means for supplying liquid fuel to the cylinders of internal combustion engines and is principally concerned with vaporizing devices comprising auxiliary vaporizers adapted for use during starting and light running periods. Such devices are particularly useful in engines using crude oils or heavy fuels. These fuels are difficult to ignite at starting, but they ignite efficiently, during normal running, owing to the high temperature of the vaporizing chamber.

One object of the present invention is to adapt an arrangement of auxiliary vaporizer and hot plate or electric igniter so that such arrangement is utilized only as occasion requires, as during starting, the life of the vaporizer being thereby greatly increased while at the same time increased efficiency during normal running of the engine is obtained. Also the carrying out of this object enables an igniter of relatively small proportions to be used.

A further object is to provide a vaporizer, preferably of more or less spherical form, with an auxiliary injector directed so as to deliver its jet on to an ignition device and with a main fuel injector directed so as to deliver its jet, or a portion thereof, on to a part of the interior of the vaporizing chamber.

Yet another object is to devise an injector valve arrangement of such a nature that the injection of fuel for normal running is automatically taken up by the main fuel injector as soon as the auxiliary injector is turned off and to so coördinate the two injectors that when the auxiliary is turned on, the whole or principal portion of the fuel supply passes through the auxiliary injector and no fuel or only very little passes through the main injector. The auxiliary injector may be used at starting and during light running while the main injector is used during normal running and automatically comes into operation, or becomes inoperative, accordingly as the auxiliary injector is put out of or into operation.

In order that the invention may be readily understood, reference is made to the accompanying drawing which shows, principally in central vertical section, a cylinder head fitted with a vaporizing chamber and fuel injectors, the latter being connected with a fuel pump, in accordance with these improvements.

In carrying the invention into practice, the head $a$ of the engine cylinder $b$ is formed or fitted with a vaporizing chamber $c$ $c'$ the spherical form of vaporizing chamber shown in the drawing being preferred, for reasons known to those skilled in the art, and for the reason that it enables the main injector $d$ to be advantageously disposed for the direction of its jet toward or against a highly heated surface. The vaporizing chamber, or the lower portion $c$ thereof, may be cast in one with the cylinder head $a$ which may be jacketed as shown. The upper portion or half $c'$ of the spherical chamber may be jacketed and adapted for bolting down on to the cylinder head in correct relation with the lower half. In the head casting there is formed at a suitable angle a housing $e$ for the auxiliary injector $f$ and this housing opens into the lower half of the vaporizing chamber. In the upper portion $c'$ of the vaporizing chamber there is an aperture $g$ in which is secured an igniter. The igniter illustrated is a hot plug, but it may be electrical or of the hot plate or other variety. In the example shown a cast iron plug $h$ fitted with a flanged steel stem $i$, or a stem carrying a plate, may be inserted and the external portion of this plug may be protected by a flame guard or draft screen $k$, permitting of the application of a flame for heating up the igniter device. If the auxiliary injector $f$ cannot be angularly positioned so that its axis passes directly across the chamber to the igniter $j$, the jet orifice of this injector may be angularly formed or fitted with a deflector $l$, so that its jet will be delivered on to the igniter $j$, as indicated. The nozzle portion of the auxiliary injector $f$ is fitted with a lightly loaded valve, which may be a ball $m$ normally pressed against a seating by a small spring $n$ coiled round a slotted nipple

*o* adapted to prevent the ball from closing the jet orifice when the ball is forced from its seat by the pressure of the supply.

The main injector *d* is disposed so that its axis is at an angle to a prolongation of the axis of the cylinder *b*. The jet from this injector, therefore, is not directed fairly through the neck portion *p* joining the vaporizing chamber with the cylinder *b*, but is wholly or partly directed toward a portion of the lower half *c* of the spherical vaporizing chamber. Within the said lower half there may be arranged a hemispherical liner *q* with an aperture for affording communication with the cylinder *b* and so dimensioned that its exterior is situated at a short distance from the interior wall of the lower half *c* of the vaporizing chamber. This gives, in known manner, a heat-insulating space *s* between the liner *q* and the lower half *c* of the chamber, so that during the normal running the liner *q* attains a sufficiently high temperature or retains sufficient heat for igniting the fuel injected by the main injector. The liner *q* may be suspended by a flange *r* at its upper edge, the flange *r* being seated in a recess in the head casting. The valve *t* in the main injector is suitably of the needle or plunger variety, the needle or coned end being normally seated under the pressure of a heavy spring *u* acting upon the stem or plunger *v*. The latter is guided for the greater part of its length in a close fitting sleeve *w* and at its outer end may carry a cap *x* slidably engaging the exterior of the sleeve *w* and acting as a centering device and abutment for the heavy spring *u*. The loading of the latter is preferably adjusted by means of washers *y* of predetermined thickness between the bracket *z* and the head of the spring *u*. At the inner end of the sleeve or body portion *w* of the main injector *d* the diameter of the bore is enlarged so that an annular chamber surrounds the stem or plunger *v* and the fuel inlet passage 1 communicates with this annular chamber. This enlarged bore is preferably made in a removable nipple 2 the inner end of which is formed with a seating for the needle or coned valve *t*. It is advantageous to reduce the diameter of the stem or plunger *v* for a short length at the valve end as shown, and to provide in the nipple a short liner 3 having longitudinal grooves on its exterior radial grooves or notches on its lower end, and a bore which closely fits the reduced end of the stem or plunger *v*. The lower end of this liner is kept in contact with the bottom of the nipple by means of a spring 4. With this liner the fuel enters the annular space around the reduced end portion of the stem or plunger *v*, then passes down the grooves on the exterior of the liner 3, and finally passes to the valve aperture or nozzle opening through the radial grooves in the lower end of the liner 3. Thus the fuel is delivered to the cone valve *t* at right angles to the axis thereof, and a well-directed jet of well-atomized fuel is insured.

It is only necessary to have a single pump 5 for serving the two injectors *d* and *f* the delivery pipe 6 of this pump being branched to serve the auxiliary injector and a stop cock 7 being inserted in this branch for shutting off the auxiliary injector *f* when desired.

When starting the engine, the ignition device, if of the hot plate or hot plug variety, is heated to the proper temperature, and the stop cock 7 is opened so that the pump 5 may serve the auxiliary injector *f*. Upon revolving the crank shaft, the pump makes a delivery, the pressure of which readily opens the valve *m* in the auxiliary injector so that a jet is forced through the auxiliary injector on to the igniter *j*. No fuel passes through the main injector *d*, however, because the pressure, being relieved by the delivery through the auxiliary injector *f* is insufficient for overcoming the load of the heavy spring *u* upon the stem or plunger *v* of the main injector valve *t*. The injected fuel strikes the igniter *j* and the ensuing combustion starts the engine. During a suitable period following this actual start the engine is run by means of the auxiliary injector *f* and the vaporizing chamber *c c'*, or the liner *q* therein acquires a high temperature from the combustion of the successive charges. The stop cock 7 is then closed so that fuel is no longer supplied to the auxiliary injector *f*. Thereupon the pressure rises in the supply pipe 6 to the main injector *d* and such pressure acts on the stem or plunger *v* as a ram and raises it against the action of the spring *u* so that fuel is injected through the main injector at the correct moment in each cycle. The jet from the main injector *d* or a portion of such jet, passes across the vaporizing chamber, and if it is not ignited during such passage, it will be ignited upon striking the lower half *c* of the vaporizing chamber, or the liner *q* therein.

In order to prevent an air lock in the main injector *d* an air relief passage may be formed between the annular chamber and an outlet 8 normally closed by a removable plug 9. The liner *q* for the spherical vaporizing chamber is not necessary when the lighter fuels are employed.

It will be apparent that the action of the main injector *d* upon the turning off of the stop cock 7 is entirely automatic as also is that of the auxiliary injector *f* upon the opening of the stop cock 7. It will be apparent, also, that only one of the injectors *f d* can be in operation, or in effective operation at any given time, as the putting into operation of either of the injectors results in the cutting out or virtual cutting out, of the other injector.

The invention is therefore, quite distinct from known arrangements employing pilot or auxiliary jets for effecting the ignition of main jets, as for example arrangements in which a main jet is injected into a vaporizing chamber axially of the cylinder and an auxiliary jet of relatively small proportions is injected into the said chamber transversely and immediately before the injection of the main jet.

I claim:

1. Internal combustion engine vaporizer comprising in combination an auxiliary injector, an igniter disposed in said vaporizer in the path of the jet of said auxiliary injector, a main injector disposed so as to direct its jet on to a hot part of the interior of said vaporizer, and controlling means operative upon said injectors whereby only one of them can be in effective operation at one time.

2. Internal combustion engine vaporizer comprising in combination an auxiliary injector, an igniter disposed in said vaporizer in the path of the jet of said auxiliary injector, a main injector nozzle disposed so as to direct its jet on to a hot part of the interior of said vaporizer, a loaded self-seating valve controlling the jet delivery of said main injector nozzle, said valve being adapted for automatically opening under a predetermined fuel supply pressure and a control valve for the auxiliary injector.

3. Internal combustion engine vaporizer comprising in combination an auxiliary injector nozzle, an igniter disposed in said vaporizer in the path of the jet of said auxiliary injector nozzle, a lightly loaded self-seating valve disposed in said auxiliary nozzle and adapted for automatic opening under pressure of the fuel supply, a cock controlling the supply to said auxiliary nozzle, a main injector nozzle disposed so as to direct its jet on to a hot portion of the interior of said vaporizer, and a loaded self-seating valve controlling the jet delivery of said main injector nozzle, said loaded valve being adapted for opening under a predetermined fuel supply pressure.

4. Internal combustion engine vaporizer comprising in combination a vaporizing chamber in two parts, an inner part having a contracted neck providing communication with the cylinder head on which the vaporizer is mounted and an outer part fitted on to said inner part, an igniter mounted in the outer part of said chamber, an auxiliary injector mounted in the inner part of said chamber and directed across the chamber away from said neck and toward said igniter, a main injector disposed so as to direct its jet on to a hot part of the interior of said vaporizer, and controlling means operative upon said injectors whereby only one of them can be in effective operation at one time.

5. Internal combustion engine vaporizer comprising in combination a vaporizing chamber adapted to be mounted on the head of a cylinder and having a neck portion communicating with said cylinder, a main injector nozzle mounted on an outer portion of said chamber and at an angle to the axis of the cylinder so as to direct its jet delivery on to a portion of the interior surface of said chamber adjacent to said neck, an auxiliary injector on said chamber, an igniter disposed on said chamber in the path of the jet of said auxiliary injector and controlling valve means operative upon said injectors in such manner that only one of them can be in effective operation at one time, substantially as set forth.

6. Internal combustion engine vaporizer comprising in combination an auxiliary injector, an igniter disposed in said vaporizer in the path of the jet of said auxiliary injector, a main injector nozzle disposed so as to direct its jet on to a hot part of the interior of said vaporizer, a cone valve seated in the jet orifice of said nozzle and so that an area of said valve is free for access by a pressure fuel supply, a stem on said valve, guiding means inclosing said stem and making said area effective under pressure for lifting said valve, a loading spring operative upon said valve to seat it, pressure supply means for said auxiliary and main injectors, and a control cock on the supply to said auxiliary injector.

7. Internal combustion engine vaporizer comprising in combination an auxiliary injector, an igniter disposed in said vaporizer in the path of the jet of said auxiliary injector, a main injector nozzle disposed so as to direct its jet on to a part of the interior of said vaporizer, a cone valve seated in the jet orifice of said nozzle and so that an area of said valve is free for access by a pressure fuel supply, a stem on said valve having a reduced portion adjacent to said cone valve, guiding means inclosing the larger diameter portion of said stem and making said area effective under pressure for lifting said valve, a loading spring operative upon said valve to seat it, pressure supply means for said auxiliary and main injectors the pressure supply being admitted to an annular space in said main injector surrounding the reduced portion of said stem, and a control cock on the supply to said auxiliary injector.

8. Internal combustion engine vaporizer comprising in combination an auxiliary injector, an igniter disposed in said vaporizer in the path of the jet of said auxiliary injector, a main injector nozzle disposed so as to direct its jet on to a part of the interior of said vaporizer, a cone valve seated in the jet orifice of said nozzle and so that an area of said valve is free for access by a pressure fuel supply, distributer means in connection with said valve and adapted to direct the supply to said valve angularly to the axis thereof, a stem on said valve, guiding means inclosing said stem and making said area effective under pressure for lifting said valve, a loading spring operative upon said valve to seat it, pressure supply means for said auxiliary and main injectors, and a control cock on the supply to said auxiliary injector.

9. Internal combustion engine vaporizer comprising in combination an auxiliary injector, an igniter disposed in said vaporizer in the path of the jet of said auxiliary injector, a main injector nozzle disposed so as to direct its jet on to a part of the interior of said vaporizer, a cone valve seated in the jet orifice of said nozzle and so that an area of said valve is free for access by a pressure fuel supply, a stem on said valve having a reduced portion adjacent to said cone valve, a guide casing inclosing said stem and leaving an annular space around said reduced portion and making said area effective under pressure for lifting said valve, a sleeve surrounding the reduced portion of said stem and formed with external longitudinal passages communicating with notches formed in the end of said sleeve, a spring operative on said sleeve to press it toward the seat of said valve, a loading spring operative upon said valve to seat it, pressure supply means for said auxiliary and main injectors the pressure supply being admitted to the annular space around the valve stem in said guide casing, and a control cock on the supply to said auxiliary injector.

10. Internal combustion engine vaporizer comprising in combination an auxiliary injector, an igniter disposed in said vaporizer in the path of the jet of said auxiliary injector, a main injector nozzle disposed so as to direct its jet on to a part of the interior of said vaporizer, a cone valve seated in the jet orifice of said nozzle and so that an area of said valve is free for access by a pressure fuel supply, distributer means in connection with said valve and adapted to direct the supply to said valve angularly to the axis thereof, a removable nipple for said nozzle, said nipple being formed with the jet orifice and valve seat and containing said distributer means, a stem on said valve, guiding means inclosing said stem and making said area effective under pressure for lifting said valve, a loading spring operative upon said valve to seat it, pressure supply means for said auxiliary and main injectors, and a control cock on the supply to said auxiliary injector.

11. Internal combustion engine vaporizer comprising in combination an auxiliary injector, an igniter disposed in said vaporizer in the path of the jet of said auxiliary injector, a main injector nozzle disposed so as to direct its jet on to a part of the interior of said vaporizer, a loaded self-seating valve controlling the jet delivery of said main injector nozzle, said valve being adapted for opening under a pre-determined fuel supply pressure, a casing for said valve, a controllable vent on said casing, a control valve for the auxiliary injector, and pressure supply means connected with said auxiliary and main injectors.

12. Internal combustion engine vaporizer comprising in combination an auxiliary injector, an igniter disposed in said vaporizer in the path of the jet of said auxiliary injector, a main injector nozzle disposed so as to direct its jet on to a hot part of the interior of said vaporizer, a loaded self-seating valve controlling the jet delivery of said main injector nozzle, said valve being adapted for automatically opening under a pre-determined fuel supply pressure, a self-seating valve in the nozzle of said auxiliary injector adapted to be opened by the pressure of supply, a single source of pressure fuel supply, pipes branching therefrom to the respective injectors, and a control cock on the branch serving the auxiliary injector.

13. Internal combustion engine vaporizer comprising in combination a somewhat globular vaporizing chamber, having an opening therein communicating with the engine cylinder, a main injector nozzle mounted on a portion of said chamber distant from the cylinder, and directed on to a portion of the interior adjacent to said opening, an igniter mounted on a portion of said chamber distant from said cylinder, an auxiliary injector mounted on said chamber and disposed so as to direct its jet across said chamber on to said igniter, and fuel control means associated with said injectors, said means being adapted for permitting of the effective operation of only one injector at any time, substantially as set forth.

14. Internal combustion engine vaporizer comprising in combination a somewhat globular vaporizing chamber having an opening therein communicating with the engine cylinder, a main injector nozzle mounted on a portion of said chamber distant from said cylinder and directed on to a portion of the interior adjacent to said opening, an igniter mounted on a portion of said chamber distant from said cylinder, an auxiliary injector mounted on said chamber and disposed so as to direct a jet across said chamber and on to said igniter, a self-seating valve in said main injector adapted for opening under a pre-determined pressure of fuel supply, a back pressure valve in said auxiliary injector, this valve opening readily under pressure of the fuel supply, and a control cock controlling the fuel supply to said auxiliary injector substantially as and for the purpose set forth.

15. Internal combustion engine vaporizer comprising in combination a vaporizing chamber having an inner part cast in one with a cylinder head and an outer part fixed on as a cover to the inner part, which has an opening for communication with the cylinder, an igniter disposed in the outer part, a main injector disposed in the outer part and directed toward an interior surface of the inner part, an auxiliary injector disposed in the inner part and directed toward said igniter, and fuel control means associated with said injectors said means being adapted for permitting of the effective operation of only one injector at any time, substantially as set forth.

HENRY KENT-NORRIS.